United States Patent
Bosloy et al.

(10) Patent No.: US 7,058,301 B2
(45) Date of Patent: Jun. 6, 2006

(54) APPARATUS AND METHOD FOR PLANNED WAVELENGTH ADDITION AND REMOVAL IN A WAVELENGTH DIVISION MULTIPLEXED SYSTEM

(76) Inventors: Jonathan L. Bosloy, 29 Marchbrook Circle, Kanata, Ontario (CA) K2W 1A1; Lacra Pavel, 73 Whitestone Drive, Ottawa, Ontario (CA) K2C 4B3; Chris Passier, 25 Zokol Crescent, Kanata, Ontario (CA) K2K 2K4; Matthew Brown, 124 Terraview Drive, RR2, Kinburn, Ontario (CA) K0A 2H0

( * ) Notice: Subject to any disclaimer, the term of this patent is extended or adjusted under 35 U.S.C. 154(b) by 682 days.

(21) Appl. No.: 10/087,719

(22) Filed: Feb. 28, 2002

(65) Prior Publication Data

US 2004/0208518 A1    Oct. 21, 2004

(51) Int. Cl.
*H04B 10/08*    (2006.01)
*H04B 10/12*    (2006.01)
*H04J 14/02*    (2006.01)

(52) U.S. Cl. .......................... 398/38; 398/30; 398/37; 398/83; 398/94; 359/337.12; 359/337.13; 359/341.33; 359/341.44

(58) Field of Classification Search ................ 398/30, 398/37, 38, 25, 50, 51, 67, 68, 107, 83, 94, 398/197, 31, 92; 359/337.12, 341.33, 341.41, 359/337.13

See application file for complete search history.

(56) References Cited

U.S. PATENT DOCUMENTS

| 5,680,234 | A | 10/1997 | Darcie et al. ............... 359/110 |
| 5,978,115 | A | 11/1999 | Condict et al. ............. 359/124 |
| 6,031,647 | A | 2/2000 | Roberts ..................... 359/161 |
| 6,108,123 | A | 8/2000 | Kinoshita .................. 359/337 |
| 6,233,078 | B1 | 5/2001 | Harano et al. ............. 359/134 |
| 6,268,945 | B1 | 7/2001 | Roberts ..................... 359/161 |
| 6,304,347 | B1 * | 10/2001 | Beine et al. ................. 398/38 |
| 6,819,875 | B1 * | 11/2004 | Touma ....................... 398/177 |
| 2001/0015838 | A1 | 8/2001 | Iwata et al. ................ 359/124 |
| 2002/0163683 | A1 * | 11/2002 | Antoniades et al. ........ 359/110 |
| 2002/0186432 | A1 * | 12/2002 | Roorda et al. ............. 359/128 |
| 2003/0151799 | A1 * | 8/2003 | Wight et al. ............... 359/334 |

* cited by examiner

*Primary Examiner*—M. R. Sedighian (57) ABSTRACT

A request method for performing optical power management to accomplish planned addition and removal of wavelengths in an optical communications system is disclosed, wherein each wavelength has a path of transmission through the system. The method comprises communicating a request for a power ramp to at least one path network component in the path, determining that the path network component has made preparations for the power ramp, and performing a power ramp in response to the determination. Further, a response method for performing power management to accomplish planned addition and removal of wavelengths in an optical communications system is disclosed, wherein each wavelength has a path of transmission through the system. The method comprises receiving a request for a power ramp, making preparations for the power ramp, determining that the power ramp has been completed, and resuming normal operation in response to the determination.

33 Claims, 3 Drawing Sheets

APPARATUS AND METHOD FOR PLANNED WAVELENGTH ADDITION AND REMOVAL IN A WAVELENGTH DIVISION MULTIPLEXED SYSTEM

FIELD OF THE INVENTION

The present invention generally relates to optical communications systems and particularly relates to optical power management in a wavelength division multiplexed system.

BACKGROUND OF THE INVENTION

There is considerable interest today in optical power management in wavelength division multiplexed systems, particularly relating to addition and deletion of wavelengths (i.e. channels) in a network and suppression of resulting transient behavior. Resulting transient behavior is undesirable because it leads to an increase in error rate of data that is recovered by the receiver, and it can occur when the power per channel is either too high or too low. For example, if the power per channel is too high, then non-linear effects like self-phase modulation can increase. Further, if the power per channel is too low, then the signal to noise ratio is decreased. Thus, proper power management is critical to normal operation of a system, and methods have been developed in the past for achieving proper power management in wavelength division multiplexed systems.

Past systems have typically relied on using erbium doped fiber amplifiers that switch from an automatic power control mode to an automatic gain control mode when a ramp up or down in the input power (i.e. power ramp) occurs that results from respective addition or removal of a wavelength. According to this previous solution, switch in mode is triggered when a detected rate of change of input power exceeds a predetermined threshold, and the result is an alteration in control of the amplifier pump currents.

Both automatic power control and automatic gain control are achieved by controlling the erbium doped fiber amplifier pump currents. An automatic power control mode provides stability in that it achieves constant output power no matter how the input power to the amplifier may vary; thus this mode is preferable when wavelengths are not being added or removed along the path containing the amplifier. If wavelengths are added while maintaining automatic power control mode, however, power per channel can decrease. Similarly, if channels are removed while automatic power control mode is maintained, power per channel can increase. In either case, it is preferable to maintain a constant power per channel; thus, it is necessary for the amplifier to switch to an automatic gain control mode during addition and removal of wavelengths.

Automatic gain control mode achieves constant gain no matter how the input power may vary. As a result, adding and removing wavelengths while maintaining automatic gain control mode has no effect on the power per channel. It is still necessary, however, to switch back to automatic power control mode once the addition or removal is complete to maintain proper operation of the system. In the past-developed threshold-based solution, this switching back and forth between modes occurs automatically and is governed according to a predetermined threshold relating to rate of change of input power. Thus, when a wavelength is added or removed, the associated power ramp up or down is detected if it exceeds the predetermined threshold. In response, the amplifier can switch to automatic gain control mode for the duration of the power ramp and vary the output power to maintain the gain at its last known value. The threshold-based solution, however, has its weaknesses.

Overshoot and undershoot resulting from imperfect response time is one weakness of the threshold-based solution. Response time for a single amplifier may vary from one-hundred microseconds to one millisecond. Thus, by the time the amplifier switches to automatic gain control mode and back, an overshoot or undershoot of output power per channel occurs that is between approximately twenty-five one-hundredths decibels and three-tenths decibels. This weakness is particularly problematic in that response time and resulting overshoot or undershoot may vary depending on the number of wavelengths being added or deleted. In addition, response time and resulting overshoot or undershoot may vary from one set of wavelengths to another, even where the numbers of wavelengths in each set are equal. Moreover, the effects of undershoot and overshoot are cumulative between a transmitter and receiver. Thus, the threshold-based solution often proves inadequate, especially in ultra-long haul applications where fifty or more amplifiers may be employed between transmitters and receivers, and particularly when a large percentage of wavelengths are added or removed suddenly.

Another attempted solution to the problems relating to achieving proper power management in wavelength division multiplexed systems involves the use of dummy signals. This dummy signal-based solution provides power to unused bands to help provide stable power levels to the transmission system. Providing extra power when the actual channel count is low does succeed in providing extra stability even in ultra-long haul applications. This solution, however, has disadvantages.

There exist at least two disadvantages associated with the dummy signal-based solution. A first disadvantage of the dummy signal-based solution involves additional expense related to special circuit packs containing laser pumps that produce optical power to unused bands. A second disadvantage of the dummy signal-based solution stems from the fact that it is a manual process that is not suitable for automated setup and teardown in an agile optical network. These disadvantages, and especially the second disadvantage, render the dummy signal-based solution unsuitable as a total solution with next generation wave division multiplexed systems.

Reconfigurable optical communications systems exhibit capabilities that are inhibited by application of the threshold-based solution and the dummy signal-based solution, even when the two solutions are used together in the most beneficial fashion. Capabilities exhibited by these systems include an increase in the number of wavelengths per band, and an increase in the distance a wavelength can travel (i.e. ultra-long haul). These capabilities further include automatic and/or manual optical switching of wavelengths and/or bands of wavelengths between line systems, and mesh restoration techniques involving automatic rerouting of channels around points of failure in the network. Still further, these capabilities include dynamic addition and deletion of wavelengths as demand increases and decreases, respectively. Overall, these capabilities involve rapid addition and removal of wavelengths at any point in the network, and those points frequently correspond to ultra-long haul line systems carrying many wavelengths per band. The threshold-based solution cannot provide sufficient power management at those points, while the dummy wavelength-based solution inhibits rapid addition and removal of wavelengths. Thus, there remains a need for a solution that provides sufficient power management in next generation systems, and providing such a solution remains the task of the present invention.

SUMMARY OF THE INVENTION

In a first aspect, the present invention is a request method for performing power management to accomplish planned addition and removal of wavelengths in an optical communications system, wherein each wavelength has a path of transmission through the system. The method comprises communicating a request for a power ramp to at least one path network component in the path, determining that the path network component has made preparations for the power ramp, and performing a power ramp in response to the determination.

In a second aspect, the present invention is a response method for performing power management to accomplish planned addition and removal of wavelengths in an optical communications system, wherein each wavelength has a path of transmission through the system. The method comprises receiving a request for a power ramp, making preparations for the power ramp, determining that the power ramp has been completed and resuming normal operation in response to the determination.

In a third aspect, the present invention is an optical communications system operable to perform power management to accomplish planned addition and removal of wavelengths, wherein each wavelength has a path of transmission through the system. The system comprises a first network component adapted to communicate a request for a power ramp downstream, to receive an acknowledgement from downstream, to perform the power ramp in response to receipt of the acknowledgment, and to send a notification downstream subsequent to performance of the power ramp, wherein the notification indicates that the power ramp has been completed. The system further comprises a second network component in communication with and downstream from the first network component. The second network component is adapted to receive the request from upstream, to make preparations for the power ramp, to send the acknowledgement upstream subsequent to the preparations, wherein the acknowledgment indicates that said second network component has made preparations for the power ramp, to receive the notification from upstream, and to resume normal operations in response to receipt of the notification.

For a more complete understanding of the invention, its objects and advantages, reference may be had to the following specification and to the accompanying drawings.

DETAILED DESCRIPTION OF THE PREFERRED EMBODIMENTS

The present invention is an apparatus and method for planned wavelength addition and removal in a wavelength division multiplexed system.

Figure 1:
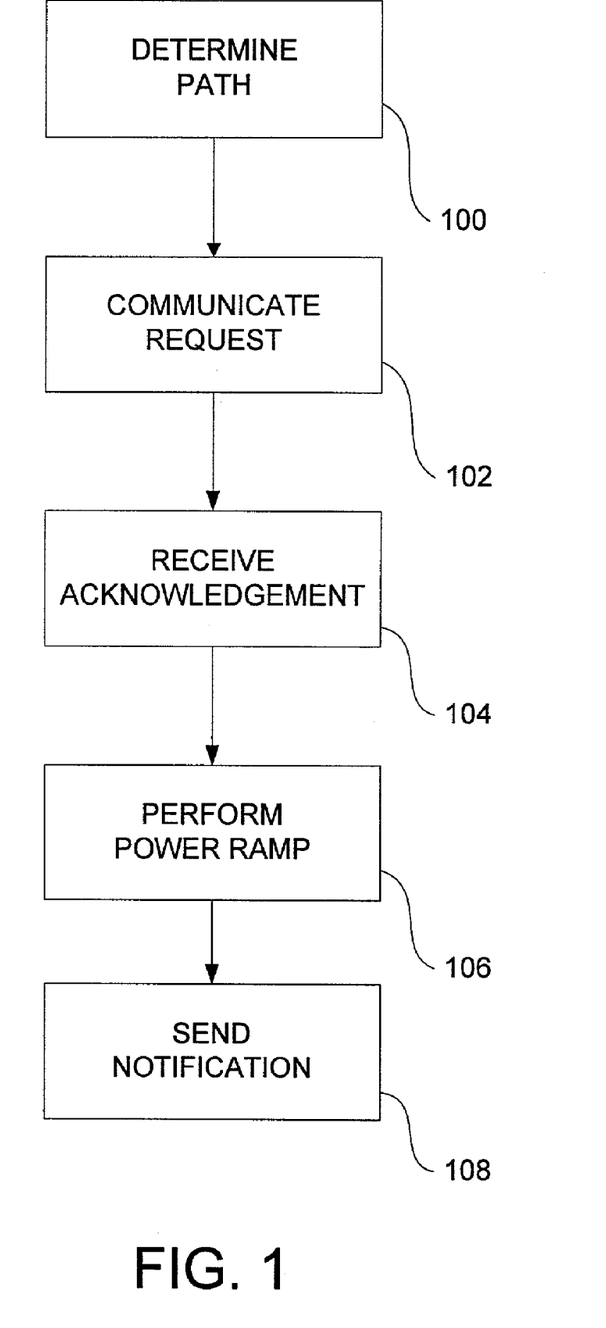
FIG. 1 is a flowchart diagram of the method of the present invention.

Referring to FIG. 1, a method according to the present invention includes several steps. These steps are discussed in detail below.

First, a path of transmission in the network is determined for a wavelength that is to be added or removed at step 100. This step may be performed online or offline, and may occur at a central management site or in a distributed fashion with an intelligent network that supports automatic routing and rerouting. For deletion of a wavelength, it is only necessary to determine the existing path. For addition of a wavelength, however, establishing the path may be necessary as part of step 100. Such establishment may be performed via manual patching operations of a wavelength across a network. Similarly, a new wavelength route may be established by creating cross-connects in a series of photonic switches along the path from the source to the destination. There may also be an existing route due to a new wavelength traveling in an existing wave band (i.e. portion of a band comprising one or more wavelengths) that has been previously set up between a source and destination locations. Thus, establishment of the path may not be necessary when adding a wavelength.

Second, a request for a power ramp is communicated to the network components along the established path at step 102. The request indicates a need for network components in the path to make any necessary preparations for the power ramp, and it may be communicated in a number of ways. The presently preferred method of communication occurs via an out of band optical supervisory channel of the network. The communication may also occur via any communication network between the network components.

Third, a determination is made at step 104 that the network components in the path have made preparations for the power ramp. Preferably, step 104 corresponds to receiving an acknowledgement indicating that the path network components have made the preparations. Alternatively, step 104 could correspond to waiting a predetermined amount of time, wherein the predetermined amount of time is predetermined to be sufficient to allow the path network components to receive the request and make preparations for the power ramp. These preparations may include switching from an automatic power control mode to an automatic gain control mode in the case of an optical amplifier. These preparations may also include freezing operation at a current state in the case of a dynamic gain equalizer, or entering a static state in the case of a Raman pump. Alternatively, a dynamic gain equalizer could ignore the power levels of any wavelengths that it has been told are being added or removed, and continue to operate to equalize the power levels of the other remaining wavelengths that are in service. As a further alternative, it may not be necessary for a Raman pump to make any preparations, since the Raman pump control algorithm may be unaffected by addition and removal of wavelengths. Thus, the type and/or degree of preparations, if any, depends on the operation and/or implementation of a particular network component.

Fourth, the power ramp is performed at step 106 in response to the determination made at step 104. The power ramp is preferably performed at a rate that permits erbium doped fiber amplifiers in the path to track the change in input power gracefully and maintain constant gain. The rate of change must be slow enough so that transient behavior is reduced to a level that is easily tolerated by the network, and this level may vary depending on the particular network and the path of the wavelength through the network. Once the power ramp has been completed there is one more step to be performed.

Fifth and finally, a notification is sent to the network components along the established path that the power ramp is complete at step 108, and path network components return to their normal modes of operation in response to the notification. Optical amplifiers, for example, switch to automatic power control mode. Similarly, Raman pumps exit static mode if appropriate, and digital gain equalizers unfreeze their current state of operation and/or manage all service wavelengths, as appropriate. Notably, step 108 may not be necessary, particularly where a path network component is adapted to return to its normal mode of operation after a predetermined amount of time. Preferably, however, step 108 is included in combination with such a path network component because the resulting combination achieves a robust system.

The method described above is more fully detailed below, and is explained with reference to a network view for more effective demonstration of a presently preferred embodiment.

Figure 2:
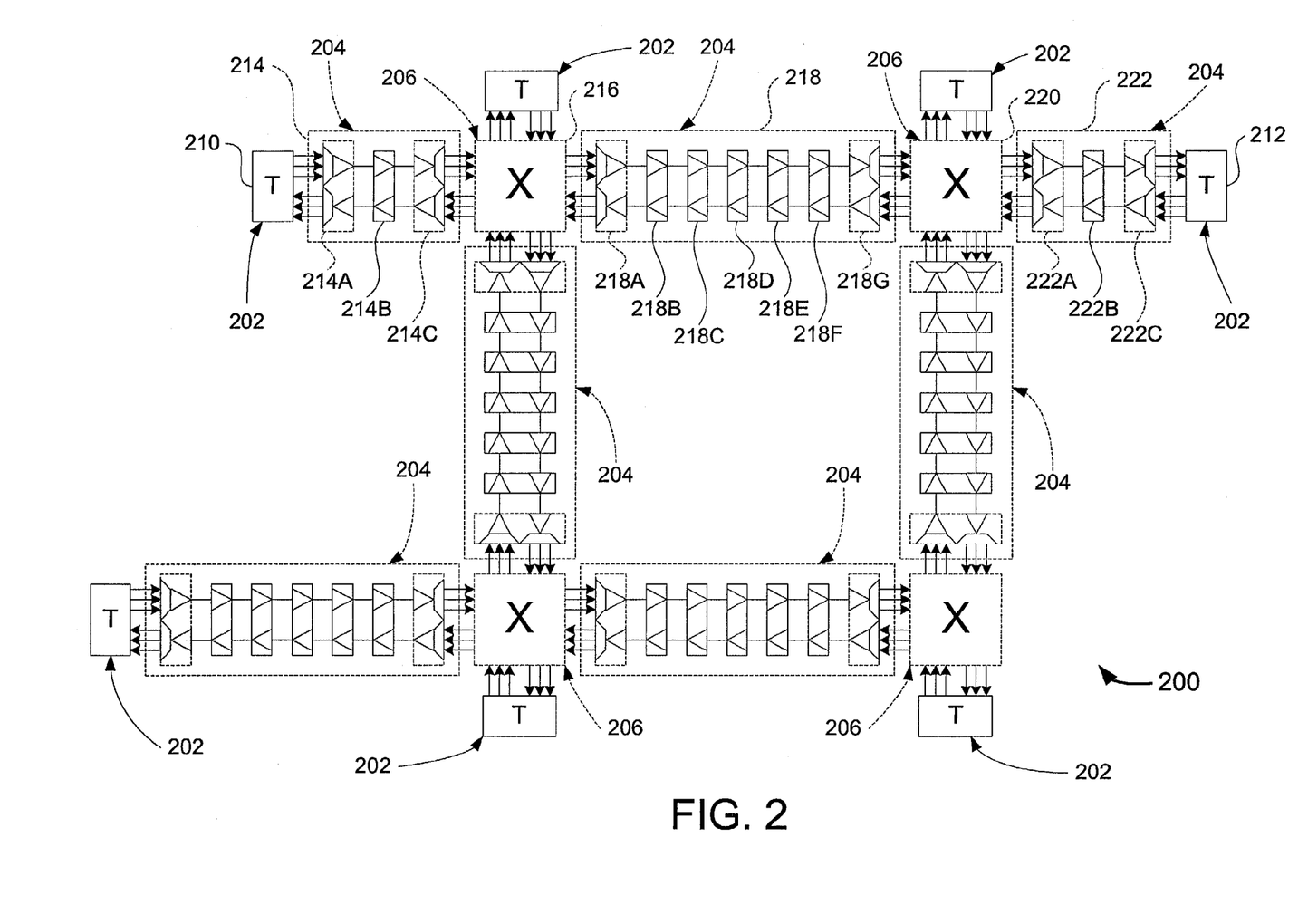
FIG. 2 is a block diagram of a next generation network for use in demonstrating the method of the present invention.

Referring to FIG. 2, a reconfigurable optical network 200 comprises multiple pluralities of transponders 202, a plurality of optical multiplex sections 204, and a plurality of photonic cross connects or photonic switches 206. Each plurality of transponders 202 could represent one or more shelves of multiple transponders. Also, the photonic switches 206 could operate on a wavelength granularity, and could require manual patch-cord connectivity to create wavelength and/or waveband granularity. Alternatively, the photonic switches 206 could be an automated photonic cross connect, again operating on a wavelength and/or waveband granularity. Further, reconfigurable optical network 200 supports wavelength and/or waveband add/drop capability at transponders 202, and also supports passing wavelengths and/or wave bands between optical multiplex sections 204 via photonic switches 206. The method of the present invention is explained more fully below with reference to the reconfigurable optical network 200.

In an example, a wavelength is added to reconfigurable optical network 200 that originates at a first transponder 210 that is a particular transponder among one of the pluralities of transponders 202, and terminates at a second transponder 212, that is another particular transponder among another plurality of transponders 202. Notably, there is another path in the opposite direction between the same two points, and the present example relates to one-half of the bidirectional path. The invention, however, works the same in the other direction, and the two directions are handled independently. Thus, they can be coordinated in parallel or one after another.

With regard to the first path, which is the path of the present example, the origination point of the wavelength, first transponder 210, is herein defined as a furthest upstream point for the path of the wavelength, while the termination point of the wavelength, second transponder 212, is herein defined as a furthest downstream point for the path. As a corollary, a downstream direction is herein defined as a direction proceeding along the path from an origin point of the wavelength to a termination point of the wavelength. As a further corollary, an upstream direction is herein defined as a direction proceeding along the path from a termination point of the wavelength to an origination point of the wavelength. Thus, the path of the wavelength is determined to proceed in a downstream direction from first transponder 210 and through a first optical multiplex section 214 to a first photonic switch 216. The path further proceeds through a second optical multiplex section 218, then to a second photonic switch 220, then through a third optical multiplex section 222, and finally to second transponder 212.

Communication of the request for the power ramp preferably proceeds from the origination point of the wavelength, and preferably occurs via an optical supervisory channel that communicates with network components at two levels according to transmission hierarchy layers of the system. The first level corresponds to an optical channel level, wherein communications are routed between network components at each end of the optical multiplex sections 204 without being examined by the other network components within the same optical multiplex sections 204. At this first level, the network components at the ends of optical multiplex sections 204 may also communicate with adjacent transponders and with network components at the ends of other optical multiplex sections 204, where those optical multiplex sections 204 are adjacent in the network. Thus, network component 214C may route directly to network components 214A and 218A at the optical channel level, but not to network component 218G. In contrast, the second level corresponds to an optical multiplex section level, wherein communications are routed from one network component of the optical multiplex sections 204 to an adjacent network component in the same optical multiplex section 204. Thus, network component 214C may route directly to network component 214B at the optical multiplex section level. Accordingly, the request is communicated at the optical channel level, and network components at that level forward that request to downstream network components at that level. Also accordingly, the communication occurs at the optical multiplex section level, and network components at that level forward that request to downstream network components that are within the same optical multiplex sections 204. Further explanation of the communication procedure with reference to the first example is detailed below.

The request for the power ramp at the optical channel level in the example proceeds via optical multiplex sections 204 from first transponder 210 to network component 214A, then to network component 214C, then to network component 218A, then to network component 218G, then to network component 222A, then to network component 222C, and finally to second transponder 212. The request is routed through other network components within first optical multiplex section 214, second optical multiplex section 218, and third optical multiplex section 222, but is not examined by these other network components. Upon arrival of requests at the optical channel level within optical multiplex sections 204, requests for power ramps at the optical multiplex section level are initiated by each network component at the furthest upstream ends of first optical multiplex section 214, second optical multiplex section 218, and third optical multiplex section 222. Accordingly, network component 214A initiates the request at the optical multiplex section level for first optical multiplex section 214. Also accordingly, network component 218A and network component 222A initiate the requests at the optical multiplex section level for second optical multiplex section 218 and third optical multiplex section 222 respectively. Thus, the requests at the optical multiplex section level are communicated downstream until they terminate at the end of their respective optical multiplex sections.

Although of different level, these requests proceed in parallel along the path through optical multiplex sections 204. Hence, a request at the optical channel level proceeds from first transponder 210 to network component 214A, where a request at the optical multiplex section level is initiated. These requests then proceed in parallel to network component 214B, and then to network component 214C, although the requests may proceed at different rates. The request at the optical multiplex section level terminates at network component 214C, while the request at the optical channel level proceeds to network component 218A, and a request at the optical multiplex section level is initiated at network component 218A in response to arrival of the request at the optical channel level. The requests thus proceed in parallel to network component 218B, then to network component 218C, then to network component 218D, then to network component 218E, then to network component 218F, and finally to network component 218G. The request at the optical channel level proceeds alone to network component 222A, where a new request is initiated at the optical multiplex section level 222A. Thence, the two requests proceed in parallel to network component 222B, and then to network component 222C. The request at the optical channel level then proceeds alone to second transponder 212, where it terminates. Thus ends communication of the request(s) in the present example. Notably, the message flow that coordinates the addition and removal of wavelengths need not follow the path of the wavelength, but may take a completely separate path. The preceding and following disclosure are merely exemplary in nature.

In accordance with the present invention, the network components of reconfigurable optical network 200 respond to a request by making preparations for the power ramp as appropriate to their type. While it is also in accordance with the present invention for the network components to wait for an acknowledgement from downstream network components as further detailed below before beginning to make preparations, immediate response is presently preferred as it produces the best overall response time. The response time is improved by this practice because necessary preparations may take some time to accomplish, thus a network component also preferably forwards a request before making the appropriate preparations to avoid delay of the communication. While it is possible to avoid unnecessary switching of amplifiers by using the alternative implementation wherein the preparations are not made unless an acknowledgment is first received, any unnecessary switching does not unduly burden the network and is outweighed by the desirability of having fast, agile networks. The types of preparations vary according to type of network component.

Network components make preparations for a power ramp that are appropriate according to their type. For example, an erbium doped fiber amplifier switches from an automatic power control mode to an automatic gain control mode. Further, a Raman pump may enter a static mode if necessary, and a dynamic gain equalizer may also freeze at a current state of operation or take other measures. Further, a transponder or other network component may set status flags that indicate status of the network component, the channel, the network or other types of auxiliary information that may assist in operation of the network and/or coordination of power ramps, etc. It is also envisioned that a network component may not need to make preparations, but may still serve in coordinating the power ramp. In any case, completion of any necessary preparations preferably serves as a precondition to sending of an acknowledgement.

Acknowledgements are preferably first sent by furthest downstream network components at each level to adjacent upstream network components at that level. For example, once it completes necessary preparations, network component 214C sends an acknowledgement at the optical multiplex section level to network component 214B. Similarly, once having completed necessary preparations, network components 218G and 222C send acknowledgments at the optical multiplex section level to network components 218F and 222B respectively. Similarly, once completing any necessary preparations, second transponder 212 sends an acknowledgment to network component 222C. Network components that do not serve as termination points, however, do not send acknowledgements until acknowledgements have been received from downstream network components.

Acknowledgments are sent to upstream network components by non-termination point network components only after any necessary preparations have been made, and only after at least one acknowledgement has been received from adjacent downstream network components. For example, network components 214B, 218F, and 222B do not send acknowledgements at the optical multiplex section level to network components 214A, 218E, and 222A respectively until they have received acknowledgements at the optical multiplex section level from adjacent upstream network components. Further, none of these elements sends the acknowledgment until each has finished making its respective necessary preparations. Thus, network component 222B sends an acknowledgment to network component 222A only after it has finished its necessary preparations and received an acknowledgment from network component 222C. At some network components, however, it is necessary to receive two or more acknowledgments before sending an acknowledgement upstream.

At network components that are furthest upstream within optical multiplex sections 204 in the path, an additional acknowledgement is required. For example, network components 214A, 218A, and 222A preferably make necessary preparations and receive acknowledgments at both the optical channel level and the optical multiplex section level from downstream network components before sending acknowledgements upstream. This condition ensures that an acknowledgement at the optical channel level does not travel upstream to an adjacent network component unless downstream network components at the optical multiplex section level have completed preparations. Thus, when an acknowledgment reaches first transponder 210, receipt of the acknowledgment indicates that any necessary preparations have been made by all downstream network components within the path.

Once the acknowledgment is received at first transponder 210, the power ramp is performed. In the case where a wavelength is removed, the power ramp is a ramp down. If a wavelength is added, as in the example, the power ramp is a ramp up. In either case, the power ramp is performed at a rate that permits the amplifiers within the path to gracefully track the change in input power, thereby reducing transients to a level easily tolerated by the network. Once the power ramp is completed, it remains necessary to notify the network components along the established path of completion of the power ramp.

In a preferred embodiment, the notification(s) proceed along the same path and in the same manner as the request(s), and network components resume normal operation following receipt of the notification. Thus, for example, optical amplifiers switch back to automatic power control mode, Raman pumps exit static mode, digital gain equalizers unfreeze their states and/or take account of all channels now in service, and transponders and other network components adjust any status flags and/or variables as appropriate to assist in proper operation of the system. Thus, the addition of the wavelength is complete. Notably, various alternative embodiments exist.

An alternative, preferred embodiment accommodates, for example, maintenance of network components. In this alternative embodiment, a network component within an optical multiplex section that requires maintenance, such as an amplifier, communicates a special request downstream to the end of its optical multiplex section. The special request indicates that the entire optical multiplex section will be ramped down, and a request as detailed above is sent along every optical multiplex section along all paths of the affected wavelengths. A coordinated preparation is accomplished, wherein the acknowledgement does not arrive at the affected amplifier until all necessary preparations have been made. Then the ramp down can be accomplished at a safe rate either by controlling the amplifier pump currents, or by variable optical attenuation within or downstream of the amplifier, but within the optical multiplex section. A notification then proceeds from the amplifier as did the special request, and the network components respond by returning to their normal operating modes. Once the amplifier is replaced, the procedure may be repeated with a ramp up instead of a ramp down. Notably, this embodiment similarly accommodates initial turn-up, turn-down, and repair of networks, network sections, and network components, wherein repair occurs in response to a failure, whereas maintenance is a scheduled task. Further, similar embodiments also exist.

In another alternative embodiment that accommodates maintenance of network components within an optical multiplex section, a special request is sent backwards along all wavelengths to their source transponders. These network components respond by performing power ramps according to the present invention as disclosed above, and the power ramps are accomplished independently on a per-channel basis. The affected optical multiplex section can monitor the input power and allow maintenance when the power is low enough. Once maintenance has been completed, the procedure can be repeated with a ramp up instead of a ramp down. The particulars of the procedure may vary according to the logical operations of the path network components.

Figure 3:
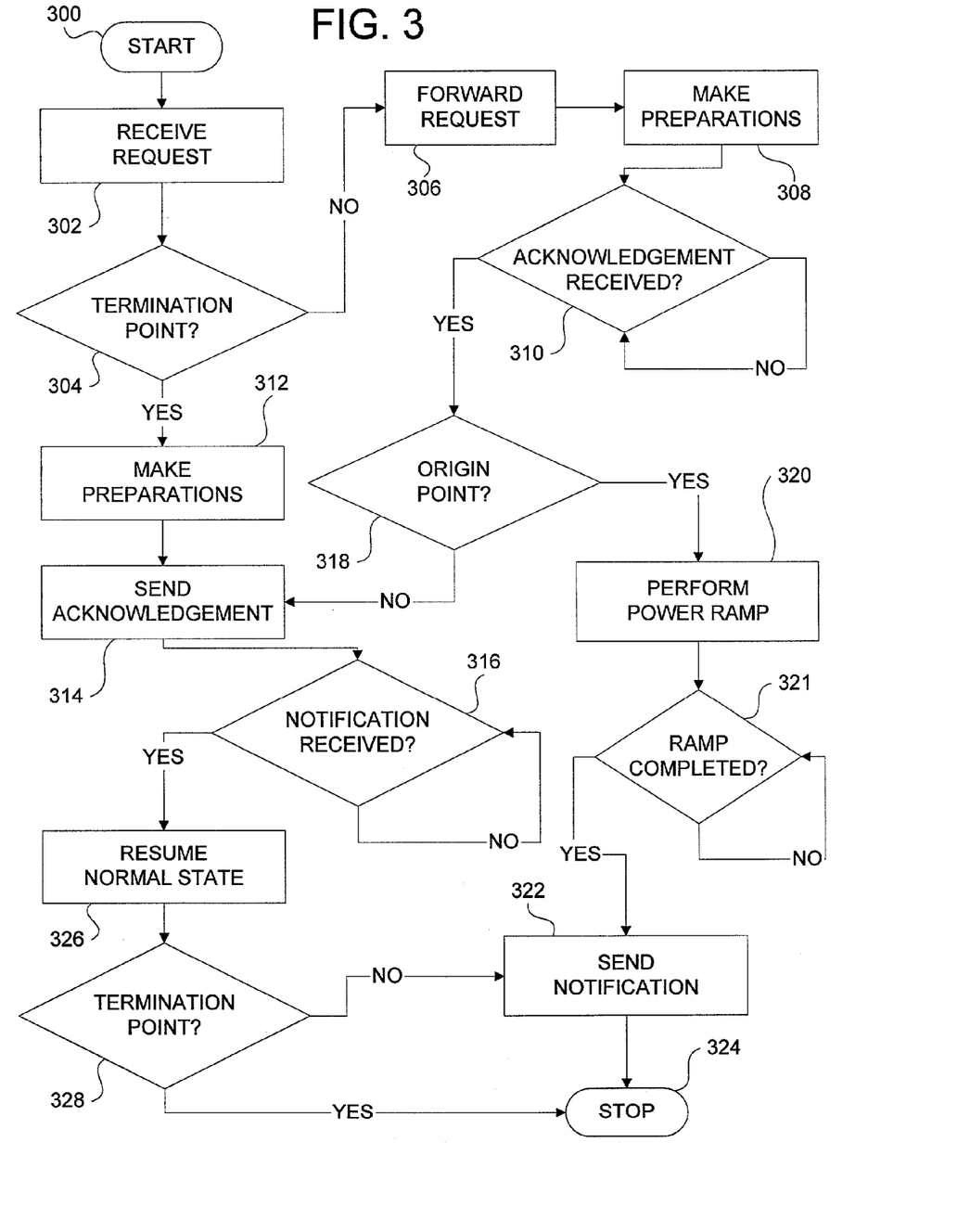
FIG. 3 is a flowchart diagram of detailed logic at a path network component according to a presently preferred embodiment of the present invention.

The logical operation of path network components varies according to the particular implementation of the present invention, but an exemplary detailed logic for the operation of path network components is described with reference to FIG. 3.

Beginning at 300, a request for a power ramp is received at step 302. In the case of a network component that is an origin point, this step 302 corresponds to receiving a command and/or deciding to add or delete a wavelength. Further, a request received from an upstream network component must be one that is actually examined by the present network component. Thus, an optical channel level request received by a network component that does not examine those requests does not constitute such a request for that network component. Rather, an optical multiplex section level request fulfills the condition for that element, and while the two requests are communicated in parallel in the preferred embodiment, the present invention is not limited to the case of parallel communication. Instead, receipt of a request may be by any network at whatever level is recognizable to and/or by the network component.

Further processing depends on whether the present network component is a termination point as at 304. In the preferred embodiment, a present network component is a termination point if it responds to an optical channel level request and is the furthest downstream element in the path of the wavelength. Also in the preferred embodiment, a present network component is a termination point if it responds to an optical multiplex section request and is the furthest downstream network component in the optical multiplex section. In the preferred embodiment, a network component at the furthest downstream end of an optical multiplexing section receives and examines both requests. It serves as a termination point at the optical multiplexing section level, but not at the optical channel level.

If the present network component is not a termination point, it forwards the request at step 306. For an origin point, this step 306 corresponds to initiating the request and communicating it to at least one adjacent downstream network component at the channel level. For other network components, this step 306 corresponds to communicating the request at the appropriate level to at least one adjacent downstream network component. In a preferred embodiment, for network components that are furthest upstream in an optical multiplexing section, a request is forwarded downstream at the optical channel level while another request is initiated and communicated downstream at the optical multiplex section level. Once the request is forwarded, necessary preparations are made at step 308 as discussed above. The present network component then preferably waits to receive an acknowledgement at 310. As discussed above with reference to the preferred embodiment, network components that are furthest upstream in an optical multiplex section wait for acknowledgements at both levels. It is also envisioned that additional acknowledgments may be required, particularly at these points, when coordination of simultaneous power ramps occurs.

Returning to 304, if the present network component is a termination point, it makes any necessary preparations at step 312 as discussed above and preferably sends an acknowledgment to the adjacent upstream network component at step 314. It then preferably awaits at least one notification at 316, and it is envisioned that multiple notifications may be awaited in the event of multiple, coordinated power ramps. Notably, a time limit is also preferably set for network components so that they will not wait too long for a notification that may never come if there is a network failure.

Returning to 310, once a network component receives all of the acknowledgments necessary to indicate that downstream network components have completed all necessary preparations, further processing depends on whether the present network component is an origin point as at 318. Origin point is defined herein as the furthest upstream network component in a relevant portion of the network. Thus, a source transponder may be an origin point in one instance, whereas a network component requiring repair or maintenance may be an origin point in another. Given the preceding discussion, further definitions of origin point will be readily appreciated by one skilled in the art according to various applications of the present invention within various types of optical networks. In the event that the present network component is not an origin point, processing proceeds to step 314 as discussed above and then awaits at least one notification at 316, also discussed above.

Returning to 318, in the event that the present network component is an origin point, a power ramp is performed at step 320 as discussed more fully above. A determination is made as to whether the power ramp has been completed at 321, and processing then proceeds to step 322, where a notification of completion of the power ramp is preferably sent to at least one adjacent network component. Thus, processing ceases at 324 for an origin point network component.

Returning to 316, once the present network component receives a notification, it can return to its normal state as more fully discussed above. Further processing depends on whether the network component is a termination point as at 328. If not, the network component preferably sends the notification to at least one adjacent downstream network component at step 322, and processing ceases at 324. If, however, the network component is a termination point, then processing simply stops at 324.

Given the preceding discussion, alternative logical implementations will be readily apparent to those skilled in the art that do not depart from the spirit and scope of the invention. Steps may be eliminated, for example, where a network component is of a type that cannot be a termination point. Further, steps may be added, deleted, or rearranged depending on the structure and operation of the network, the manner of communication between nodes, and/or additional considerations. In particular, in the alternative where an origin point network component determines that preparations have been made based on a predetermined amount of elapsed time instead of a received acknowledgment, it is not necessary for termination point network components to send acknowledgements, or for those acknowledgements to be forwarded. Further, a path network component may determine that the power ramp has been completed based on a predetermined amount of elapsed time rather than a received notification. Alternatively, a path network component may determine that the power ramp has been completed based on measuring the optical power of the wavelength or wavelengths being ramped up or ramped down, via an optical spectrum analyzer or other technique known to those skilled in the art. In the case of a wavelength ramping up, completion of the power ramp can be indicated by the optical power of the wavelength exceeding an optical power level threshold. In the case of a wavelength ramping down, completion of the power ramp can be indicated by the optical power of the wavelength being lower than an optical power level threshold. With techniques such as this, it may not be necessary for an origin point network component to send a notification. Still further, a path network component may wait for a notification before resuming normal operation, but nevertheless resume normal operation after a predetermined amount of elapsed time to ensure robustness of the system. Thus, further alternative logical implementations may be based on these cases according to the present invention.

Advantages of the present invention will be apparent based on the preceding disclosure. For example, use of signaling in the out-of-band optical supervisory channel allows for coordination over any distance. Further, use of signaling with acknowledgments allows a source transponder to verify that the entire optical path is ready for the power ramp. Still further, the present invention permits transponders anywhere in the network to ramp up or ramp down in parallel, which is important for agile networks and network restoration operations. Finally, the present invention allows for an optical multiplex section to be taken out of service and/or brought back into service in a coordinated fashion.

While the invention has been described in its presently preferred form, it will be understood that the invention is capable of modification without departing from the spirit and scope of the invention as set forth in the appended claims.

What is claimed is:

1. A request method for performing optical power management to accomplish planned addition and removal of wavelengths in an optical communications system, each wavelength having a path of transmission through the system, comprising:

communicating a request for a power ramp to at least one path network component in the path;

determining that the path network component has made preparations to successfully accommodate the power ramp as requested based on an acknowledgment from the path network component that is received from downstream, wherein the path network component is further defined as an optical amplifier, such that the preparations for the power ramp includes switching from an automatic power control mode to an automatic gain control mode; and performing a power ramp in response to said determining.

2. The method of claim 1 further comprises waiting a predetermined amount of time to allow the path network component to make preparations for the power ramp, and determining that the path network component has made preparations for the power ramp based on the elapsed wait time.

3. The method of claim 1 wherein the path network component is adapted to send the acknowledgement subsequent to the preparations.

4. The method of claim 1 wherein the path network component is adapted to make the preparations in response to receiving a request for a power ramp.

5. The method of claim 1 further comprises notifying the path network component of completion of the power ramp.

6. The method of claim 5 further comprises resuming normal operating conditions at the path network component in response to said notifying.

7. The method of claim 1 wherein the step of performing a power ramp further comprises ramping up power input to the optical communication system.

8. The method of claim 1 wherein the step of performing a power ramp further comprises ramping down power input to the optical communication system.

9. The method of claim 1 wherein the step of communicating a request further comprises using a data communications network to connect at least two network components in the optical communication system.

10. The method of claim 1 wherein the step of communicating a request further comprises using an optical supervisory channel to communicate the request.

11. The method of claim 1, wherein said performing occurs at a rate that allows the optical amplifier to track the change in input power gracefully and maintain constant gain, thereby reducing transient behavior.

12. The method of claim 1 wherein the path network component is further defined as a Raman pump, such that the preparations for the power ramp includes entering a static mode.

13. A network component adapted to accomplish planned addition and removal of wavelengths according to the method of claim 1.

14. An optical communications system adapted to perform addition and removal of wavelengths according to the method of claim 1.

15. A request method for performing optical power management to accomplish planned addition and removal of wavelengths in an optical communications system, each wavelength having a path of transmission through the system, comprising:

communicating a request for a power ramp to at least one path network component in the path;
determining that the path network component has made preparations for the power ramp; and
performing a power ramp in response to said determining,
wherein the path network component is further defined as a dynamic gain equalizer, such that the preparations for the power ramp includes at least one of: freezing a current operating state of the dynamic gain equalizer; or ignoring power levels of wavelengths undergoing a power ramp and continuing to equalize power levels of remaining wavelengths that are in service.

16. A request method for performing optical power management to accomplish planned addition and removal of wavelengths in an optical communications system, each wavelength having a path of transmission through the system, comprising:
communicating a request for a power ramp to at least one path network component in the path;
receiving an acknowledgment and determining that the path network component has made preparations for the power ramp based on the acknowledgement; and
performing a power ramp in response to said determining,
wherein the path network component is adapted to receive a downstream acknowledgment from a downstream network component in the path, the downstream acknowledgement indicating that the downstream network component has made preparations for the power ramp,
wherein the path network component is adapted to send the acknowledgement subsequent to receipt of the downstream acknowledgement,
wherein the path network component is adapted to send the acknowledgment to an upstream network component,
wherein an upstream direction corresponds to a first direction along the path that is toward a source point of the wavelength, and
wherein a downstream direction corresponds to a second direction along the path that is toward a termination point of the wavelength.

17. A response method for performing power management to accomplish planned addition and removal of wavelengths in an optical communications system, each wavelength having a path of transmission through the system, the method comprising:
receiving a request for a power ramp;
making preparations for the power ramp by placing a Raman pump in a static mode;
sending an acknowledgment upstream to a network component requesting the power ramp, wherein the acknowledgement indicates that preparations to successfully accommodate the power ramp as requested have been completed;
determining that the power ramp has been completed; and
resuming normal operation in response to said determining.

18. The method of claim 17, wherein said sending an acknowledgment occurs subsequently to said making preparations.

19. The method of claim 18, wherein said making preparations occurs in response to said receiving a request.

20. The method of claim 17 the method further comprising receiving a notification, said notification indicating completion of the power ramp,
wherein said determining is based on said receiving a notification.

21. The method of claim 17, the method further comprising waiting a predetermined amount of time, the predetermined amount of time predetermined as sufficient to allow the power ramp to be completed,
wherein said determining is based on said waiting.

22. The method of claim 17, wherein said receiving a request occurs via a data communications network connecting at least two network components of the system.

23. The method of claim 22, wherein said communicating occurs via an optical supervisory channel of the system.

24. The method of claim 17, wherein said making preparations is performed by an optical amplifier, and wherein said making preparations corresponds to switching from an automatic power control mode to an automatic gain control mode.

25. The method of claim 17, the method further comprising receiving at least one downstream acknowledgment from an adjacent, downstream network component, the downstream acknowledgement indicating that the downstream network component has made preparations for the power ramp,
wherein said sending occurs subsequent to said receiving at least one downstream acknowledgment.

26. The method of claim 25, wherein said sending corresponds to sending the acknowledgement to an adjacent, upstream network component.

27. The method of claim 25, wherein said receiving at least one downstream acknowledgment corresponds to receiving downstream acknowledgements at different levels according to transmission hierarchy layers of the system.

28. A network component adapted to accomplish planned addition and removal of wavelengths according to the method of claim 17.

29. An optical communications system adapted to perform power management to accomplish addition and deletion of wavelengths according to the method of claim 17.

30. A response method for performing power management to accomplish planned addition and removal of wavelengths in an optical communications system, each wavelength having a path of transmission through the system, the method comprising:
receiving a request for a power ramp;
making preparations for the power ramp;
determining that the power ramp has been completed; and
resuming normal operation in response to said determining,
wherein said making preparations is performed by a dynamic gain equalizer, and wherein said making preparations corresponds to at least one of:
a) freezing a current operating state of the dynamic gain equalizer; or
b) ignoring power levels of wavelengths undergoing a power ramp, and continuing to equalize power levels of remaining wavelengths that are in service.

31. An optical communications system operable to perform power management to accomplish planned addition and removal of wavelengths, each wavelength having a path of transmission through the system, the system comprising:
a first network component adapted to communicate a request for a power ramp downstream, to receive an acknowledgement from downstream, to perform the power ramp in response to receipt of the acknowledgment, and to send a notification downstream subsequent to performance of the power ramp, wherein the notification indicates that the power ramp has been completed; and a second network component in communication with and downstream from said first network component, the second network component adapted to receive the request from upstream, to make preparations for the power ramp, to send the acknowledgement upstream subsequent to the preparations, wherein the acknowledgment indicates that said second network component has made preparations for the power ramp, to receive the notification from upstream, and to resume normal operations in response to receipt of the notification.

32. A request method for performing optical power management to accomplish planned addition and removal of wavelengths in an optical communications system, each wavelength having a path of transmission through the system, comprising:

communicating a request for a power ramp to at least one path network component in the path;

determining that the path network component has made preparations to successfully accommodate the power ramp as requested based on an acknowledgment from the path network component that is received from downstream, wherein the path network component is further defined as a Raman pump, such that the prepa rations for the power ramp includes entering a static mode; and performing a power ramp in response to said determining.

33. A response method for performing power management to accomplish planned addition and removal of wavelengths in an optical communications system, each wavelength having a path of transmission through the system, the method comprising:

receiving a request for a power ramp;

making preparations for the power ramp by switching an optical amplifier from an automatic power control mode to an automatic gain control mode;

sending an acknowledgment upstream to a network component requesting the power ramp, wherein the acknowledgement indicates that preparations to successfully accommodate the power ramp as requested have been completed;

determining that the power ramp has been completed; and resuming normal operation in response to said determining.

* * * * *